United States Patent
Viviani et al.

(10) Patent No.: US 6,374,144 B1
(45) Date of Patent: Apr. 16, 2002

(54) METHOD AND APPARATUS FOR CONTROLLING A SYSTEM USING HIERARCHICAL STATE MACHINES

(75) Inventors: Gary L. Viviani, Boxford; Nick A. Parisi, Gloucester; William G. Callahan, Rockport, all of MA (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 0 days.

(21) Appl. No.: 09/219,584

(22) Filed: Dec. 22, 1998

(51) Int. Cl.$^7$ .......................... G05B 11/01; G06F 19/00
(52) U.S. Cl. .............................. 700/12; 700/8; 700/121
(58) Field of Search ............................ 700/8, 9, 12, 19, 700/20, 96, 121, 14

(56) References Cited

U.S. PATENT DOCUMENTS

| | | | |
|---|---|---|---|
| 4,551,815 A | | 11/1985 | Moore et al. ............... 708/232 |
| 4,799,141 A | * | 1/1989 | Drusinsky et al. ............ 700/12 |
| 5,197,011 A | * | 3/1993 | Biemans et al. .............. 700/96 |
| 5,465,375 A | * | 11/1995 | Thepaut et al. ............... 712/15 |
| 5,469,553 A | | 11/1995 | Patrick ....................... 713/323 |
| 5,504,896 A | * | 4/1996 | Schell et al. ................ 725/131 |
| 5,675,756 A | | 10/1997 | Benton et al. .............. 345/349 |
| 5,689,702 A | | 11/1997 | Bulusu ....................... 707/100 |
| 5,691,895 A | * | 11/1997 | Kurtzberg et al. ............ 700/29 |
| 5,710,700 A | * | 1/1998 | Kurtzberg et al. ............ 700/29 |

FOREIGN PATENT DOCUMENTS

| | | |
|---|---|---|
| EP | 0 644 573 A1 | 3/1995 |
| WO | WO 97/12303 | 4/1997 |
| WO | WO 98/29817 | 7/1998 |

OTHER PUBLICATIONS

Cho et al., *Journal of Manufacturing Systems*, vol. 14, No. 4, pp. 252–263 (1995).
Klein et al., *Computer*, vol. 27, No. 1, pp. 24–33 (Jan. 1994).

* cited by examiner

*Primary Examiner*—William Grant
*Assistant Examiner*—Paul Rodriguez
(74) *Attorney, Agent, or Firm*—Wolf, Greenfield & Sacks, P.C.

(57) ABSTRACT

A method and apparatus for controlling complex systems includes hierarchically coupled subsystems representing operative functions of the system. The hierarchically coupled subsystems are coupled to collect command data from a user and signal data from the system. Each subsystem may include one or more state machines and one or more digital signal processing and conditioning unit (DSPCU) objects. The DSCPU objects accept process commands and convert control system signals into states for further processing by the state machines. Associated with the DSPCUs of each subsystem is a data flow diagram for dictating an order of flow of commands and signals at the DSPCUs. A method of controlling the system represented by the hierarchically coupled subsystems schedules the execution of the subsystems according to an execution protocol. According to the execution protocol, for each cycle of execution of the system, the hierarchically coupled subsystems are first analyzed in ascending order of the hierarchy, with DSPCU objects being analyzed in data flow order before state machine objects, and then in descending order of the hierarchy, with state machine objects being analyzed before DSPCU objects. During the ascending execution of the hierarchy, signal data received from only those objects that are relatively lower in the hierarchy are used to update the state of any given object. During the descending execution of the hierarchy, command data received from only those objects that are relatively higher in the hierarchy are considered when updating the state of any given object.

31 Claims, 8 Drawing Sheets

METHOD AND APPARATUS FOR CONTROLLING A SYSTEM USING HIERARCHICAL STATE MACHINES

FIELD OF THE INVENTION

This invention relates in general to control systems and, more specifically, to a method and apparatus for controlling complex systems using state machines.

BACKGROUND OF THE INVENTION

Many manufacturing systems typically execute a number of independent operations in a controlled manner to provide a desired output product. One example of such a manufacturing system is an ion implantation system. The ion implantation system is used for implanting ionized atoms or molecules into a semiconductor wafer in order to insure that the desired conductivity properties are met for the wafer. The ion implantation system may include a number of mechanical components, such as an ion beam generator and vacuum pumps, each of which are independently controlled. Interactions between the mechanical components must be carefully controlled in order to insure that a viable product is output from the system.

The interactions between the mechanical components of a processing system are managed by a control system. Historically, in the 1940's and 1950's, control systems were entirely electromechanical and they did not involve software. Following this period, with the advent of low cost computers, software was utilized in order to provide "endless" flexibility. In software controlled systems, each mechanical component of the processing system is controlled via a software program. Each software program includes an interface to support communication of information. As the mechanical components interact, the effects of the interactions are passed between software program via the interfaces. A main software program may be provided to prioritize the operations performed by the different software programs to synchronize the interactions between the different mechanical components within the system.

Typical control systems are defined by a control system architecture (CSA), a control system observability component (CSO) and a control system controllability (CSC) component. The CSA organizes subsystems of the processing system into a structure that is logically consistent with the physical system to be controlled. The CSO component monitors sensory signals to determine the status of the physical system. The CSO component monitors and modifies the state of signals to actuators, where actuators are associated with each component to control the operation of the component. The signals may represent a continuous measurement or a true/false measurement. The CSC component determines which control actions to take based on the changes detected in monitored signals.

For typical control systems, the combination of hardware and software which comprises the CSA is not easily reconfigured to adapt to new conditions and requirements associated with the operation of the physical system. One reason that control systems typically are not easily reconfigurable is because of the integrated nature of the hardware and software elements of the control system. Adding new control instructions to the existing control system to support new elements may affect the timing of existing interactions of components within the system, thereby threatening the ability of the control system to perform normal operations. Hence, once the system is designed, it is difficult to incorporate new elements without revising the entire system. For example, in order to appropriately order the sequence of operations by each of the software programs, the main software program is designed to accommodate all of the interrelations between the software programs. As a result, the main software program must be capable of managing a large number of exception conditions. For example, one of the exception conditions may be that software program A may be able to transition to state X if software program B is in state Y or software program C is in state Z. Thus, the design of the main software program is often complex, degrading the performance of the main software program, and hence the overall system, and making it difficult to add or remove elements without numerous modifications to the main software program.

Hence, even if a system can somehow be adapted to incorporate new elements without revision, because of the control and timing dependencies between the components in the system, there may be significant doubts about the accuracy of the operation of the control system with the new elements. As a result, it is difficult to attempt to adapt existing operations or to reuse existing capabilities in new products. Thus, software controlled systems may not truly provide endless flexibility, and the flexibility that is provided is often at the expense of reliability.

In addition, the appropriate handling of errors in a control system including numerous independent software programs is difficult. The error handling process may be incoherent if the independent software programs are permitted to determine the appropriate method to handle an error, since the determined error handling method may not be the optimum method for the whole system. A centralized approach to error handling may be provided by performing error handling in the main program. However, adding detailed system knowledge to the main program adversely increases the complexity, thus reducing the overall flexibility of the whole system.

Object oriented methodologies currently exist to analyze and design control system behavior. However, they typically provide only a development environment on top of existing software and hardware control systems, and do not constrain the complexity.

Accordingly, it is desirable to provide an alternative method of controlling complex processing systems that would be relatively less complex to implement than conventional systems. The system should also be capable of facilitating the addition or removal of new components and allowing for an intelligent error handling process to be supported.

SUMMARY OF THE INVENTION

A control system architecture (CSA) comprised of hierarchically ordered subsystems is employed to provide a flexible and reliable means of controlling complex processes. Each subsystem is represented by one or more state machines, which provide monitoring and control of the subsystem, and one or more digital signal processing and conditioning units (DSPCUs). The DSCPUs convert control system signals into states for further processing by the state machines and/or convert command inputs to send to the control system actuators from the state machines. Associated with the DSPCUs of each subsystem is a data flow diagram for dictating flow of data between DSPCUs and order of execution of the DSPCUs. Control system observability (CSO) and control system controllability (CSC) are enabled through the interconnection between sets of parent-child state machines in the hierarchy. Child states are visible to the parent one level up in the hierarchy. Data flow is through explicit paths within one subsystem or up and down one level.

In one embodiment, each cycle of operation of the control system is operated according to an ordered protocol comprising four phases; a first data flow execution phase, an upward state machine execution phase, a downward state machine execution phase, and a second data flow execution phase. The order of each of the components in the subsystem that are executed in each of these phases is maintained in a scheduled list. The operation of each of the execution phases and a method and apparatus for scheduling execution of the state machines and data flow diagrams are described in greater detail below.

In one embodiment, data collection is synchronized to occur at fixed points during the execution of the above protocol, where data collection includes an execution of the input signals received by the system, an execution of the output signals provided by the system and receipt of commands from a user interface associated with the system. Collecting data at fixed points during the execution of the protocol enables input and output signals to be controlled in a manner that overlays the hierarchy and ensures state consistency.

As mentioned above, the four phases of the protocol occur in one operating cycle. In one embodiment, all of the phases of execution are performed within a predetermined execution period. Thus, for a given hierarchy and protocol, the time to complete execution of all tasks associated with all subsystems is known. As the components within the subsystem or the measured execution times are changed, the total execution time of each phase of the protocol, the schedule lists and/or data collection times are automatically revised.

Hierarchically coupling the state machines in the above manner facilitates the seamless incorporation or removal of components from the control system since all data flow component connections are explicitly defined. To add a component to the system, appropriate connections are made between the state machines and data flow diagrams that represent the component and other components in the system. During the execution phase, because the newly added component has been added to the desired level in the hierarchy, proper execution of the component and the timing of the signals associated with the component may be ensured. Removing a component from the system may be performed by merely removing the subsystem associated with the component from the hierarchy. Thus, no major revision of the software need be provided for modifying the control system. As a result, the control system of the present invention provides both flexibility and reliability with a minimum amount of complexity. The required revisions are localized to the single parent in the hierarchy.

The hierarchical coupling of state machines allows exception handling to be programmed into state machines that are higher in the hierarchy to appropriately handle exceptions that may occur at state machines that are lower in the hierarchy. An appropriate supervisory level within the hierarchy may be selected, where the subsystem at the supervisory level has appropriate information to make an intelligent decision with regard to the handling of each exception. As a result, the subsystems within the hierarchy are not required to make an independent judgment as to how to handle an error condition, and additionally error conditions may not have to propagate to the top of the hierarchy to be handled effectively.

According to one aspect of the invention, a system for controlling a complex system of devices having interconnected control system software components is provided. The interconnected control system software components includes one or more subsystems coupled in a hierarchy, with lower level control system software components at a given level in the hierarchy being included in a control system software component at an immediately higher level of the hierarchy. The system includes a plurality of hierarchically coupled state machines, with at least one state machine associated with each of the hierarchically coupled subsystems and means for evaluating the states of the state machines for each of the hierarchically coupled subsystems in an order defined by the hierarchy. Providing a control system with such an organized data structure allow subsystems to be added or removed from the device without requiring major modifications to the control system.

According to another aspect of the invention, a method for analyzing a system having a plurality of interconnected subsystems is provided. The interconnected subsystems are coupled in a hierarchy, with subsystems at a given level in the hierarchy being included in a subsystem at an immediately higher level of the hierarchy, and each one of the interconnected subsystems being associated with a corresponding one of a plurality of hierarchically coupled state machines. The method includes the steps of evaluating, for each subsystem, a state of the associated state machine, wherein the order of evaluation of the associated state machines is determined in response to an order defined by the hierarchy of the one or more interconnected subsystems.

According to another aspect of the invention, a control system for controlling a device includes a processor coupled to the device. The processor includes a memory for storing signals associated with the device, where the signals are received from the device and are forwarded to the device during operation of the device. The processor further includes a hierarchical data structure comprising a plurality of hierarchically interconnected subsystems representative of the operative functions of the device, means for forwarding the signals to the hierarchical data structure and means, responsive to the signals, for updating states within the hierarchical data structure in a controlled manner.

According to another aspect of the invention, an ion implantation system includes a control system for controlling the ion implantation of material by the system. The control system includes a memory for storing signals associated with the device, where the signals are received from the device and are forwarded to the device during operation of the device, a hierarchical data structure comprising a plurality of hierarchically interconnected subsystems representative of the operative functions of the device, means for forwarding the signals to the hierarchical data structure and means, responsive to the signals, for updating states within the hierarchical data structure in a controlled manner.

Although the ion implantation system is used as an example for the invention, the invention is not limited to the control of any specific type of system.

DETAILED DESCRIPTION

Various embodiments of the present invention will now be described with reference to the attached figures, where like elements are referred to by like numbers in the different drawings.

According to one aspect of the invention, a control system architecture (CSA) of hierarchically coupled subsystems representing the operative functions of a device is provided. A method of controlling the device represented by the CSA schedules the execution of the subsystems according to an execution protocol. The execution protocol performs an upwards and downwards execution of each of the subsystems for every execution cycle of the device. With such an arrangement, the operations of complex systems may be modularized into subsystems, and the interrelations between the subsystems may handled in a controlled manner in accordance with the hierarchy.

One device which may be controlled by the control system architecture of the present invention is an ion implantation system. Ion implantation has become a standard, commercially accepted technique for introducing conductivity altering impurities into semiconductor wafers. The desired impurity material is ionized in an ion source, and the ions are accelerated to form an ion beam of prescribed energy that is directed at the surface of a semiconductor wafer. The energetic ions in the beam penetrate into the bulk of the semiconductor material and are imbedded in the crystalline lattice of the semiconductor material to form a region of desired conductivity.

The performance of the ion implanter is measured in terms of wafers processed per unit time. Wafer transfer time, implant time, and down time all contribute to the total processing time, and thus it is desirable to minimize these times in order to achieve high throughput. The performance of the ion implanter is also measured in terms of dose accuracy of the ions and dose uniformity over the surface of the wafer. Because many semiconductor devices are fabricated by an ion implantation system, it is crucial to provide dose accuracy and uniformity from wafer to wafer in order to ensure that the devices have controllable and repeatable operating characteristics.

Accordingly, in order to insure that accuracy is maintained while performance is maximized, the operation of the elements of the ion implantation system are carefully coordinated so that the appropriate implantation occurs at the appropriate time without incurring unwanted delay.

Figure 1:
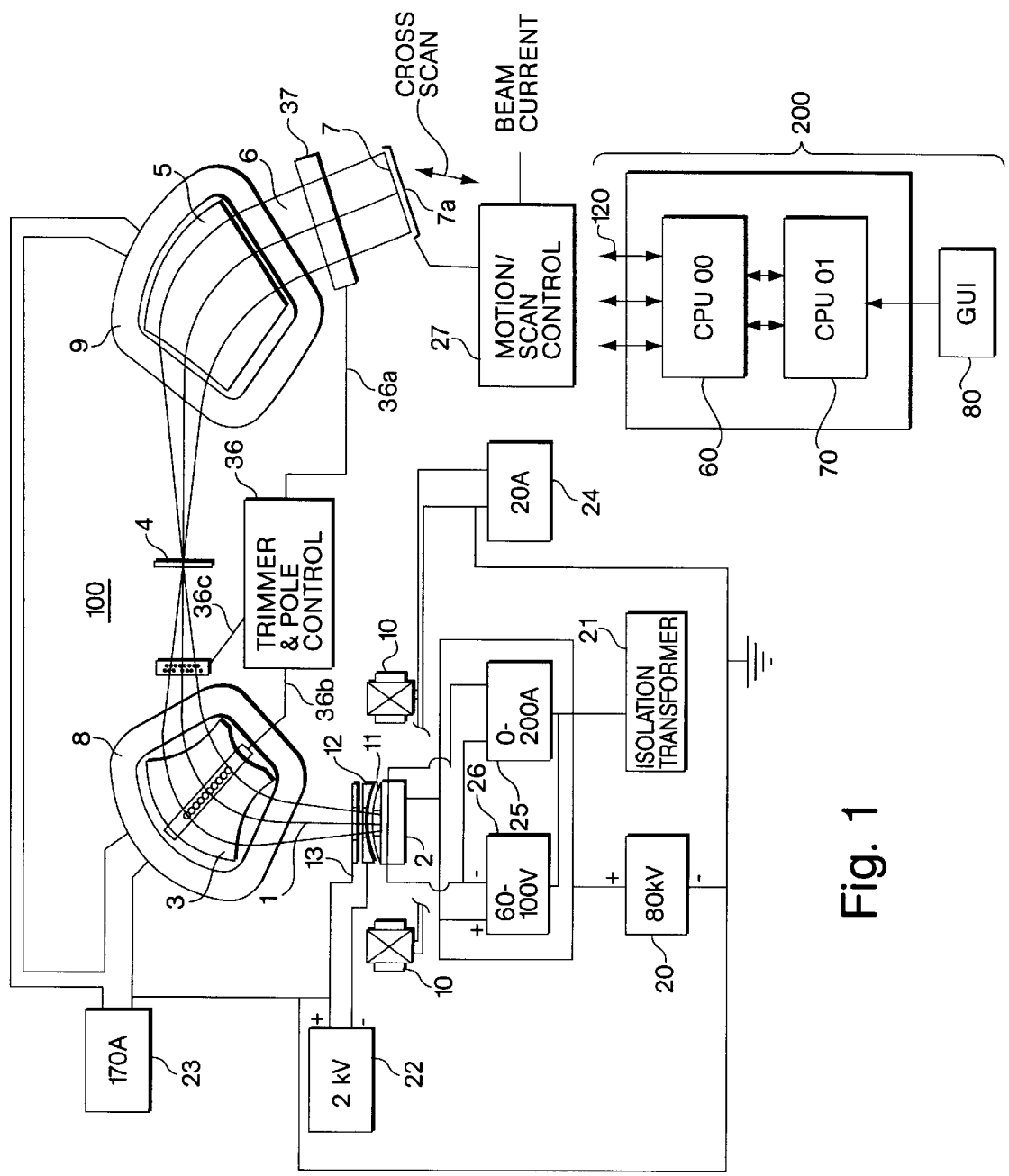
FIG. 1 is a schematic block diagram illustrating an ion implanter that may be controlled by a control system of the present invention.

One example of an ion implantation system 100 is shown in FIG. 1. The ion implantation system of FIG. 1 is described in U.S. Pat. No. 5,350,926, entitled "Compact High Current Broad Beam Implanter" and issued Sep. 27, 1994 to White et al, which is incorporated herein by reference. The ion implantation system 100 operates generally as follows.

In FIG. 1, an ion implantation system 100 operates with an ion beam 1 produced by an ion source 2. An arrangement of three slotted grids 11, 12, 13 serve to confine, extract and accelerate ions from the source. Ion beam 1 enters between the poles of an analyzing electromagnet 3 which deflects the ion beam 1 toward a resolving slit 4. Unwanted ions having differing momentum are deflected through different angles by the magnetic field, so that they are intercepted on either side of the resolving slit. Ion beam 1 diverges again after passing through the resolving aperture 4, and passes between the poles of a second electromagnet 5, to provide an output beam 6 having parallel ion trajectories. At the implant position, a target 7 is moved up and down at a controlled velocity on a stage 7a. Uniform ion implantation is accomplished by moving target 7 through the output beam 6 with its vertical component of velocity constant. When implantation of the target is completed, the stage 7a deposits the target on a conveyor belt or the like and retrieves the next target for processing.

Exact timing, dosage, and control of the elements in the ion implantation system 100 are maintained by a control system 200. According to one embodiment of the invention, the control system 200 of ion implantation system 100 is implemented by software applications that execute on a pair of Central Processing Units (CPUs) CPU 60 and CPU 70. The control system that is implemented on CPUs 60 and 70, according to one embodiment of the invention, is a periodic control system wherein the operation of the ion implantation system is modularized into a number of hierarchically arranged subsystems. Associated with each subsystem of the ion implantation system 100 is one or more state machines and one data flow diagram, where each data flow diagram identifies an order of flow of data from digital signal processing and conditioning units (DSPCUs) associated with the state machines. The general, the state machines receive state information from and send command information to the digital signal processing and conditioning objects, which in addition may read and process digital and analog inputs and numeric inputs, and forward signals to the signal lines 120. Selected commands may be input to the control system 200 via a graphical user interface (GUI) 80.

Figure 2:
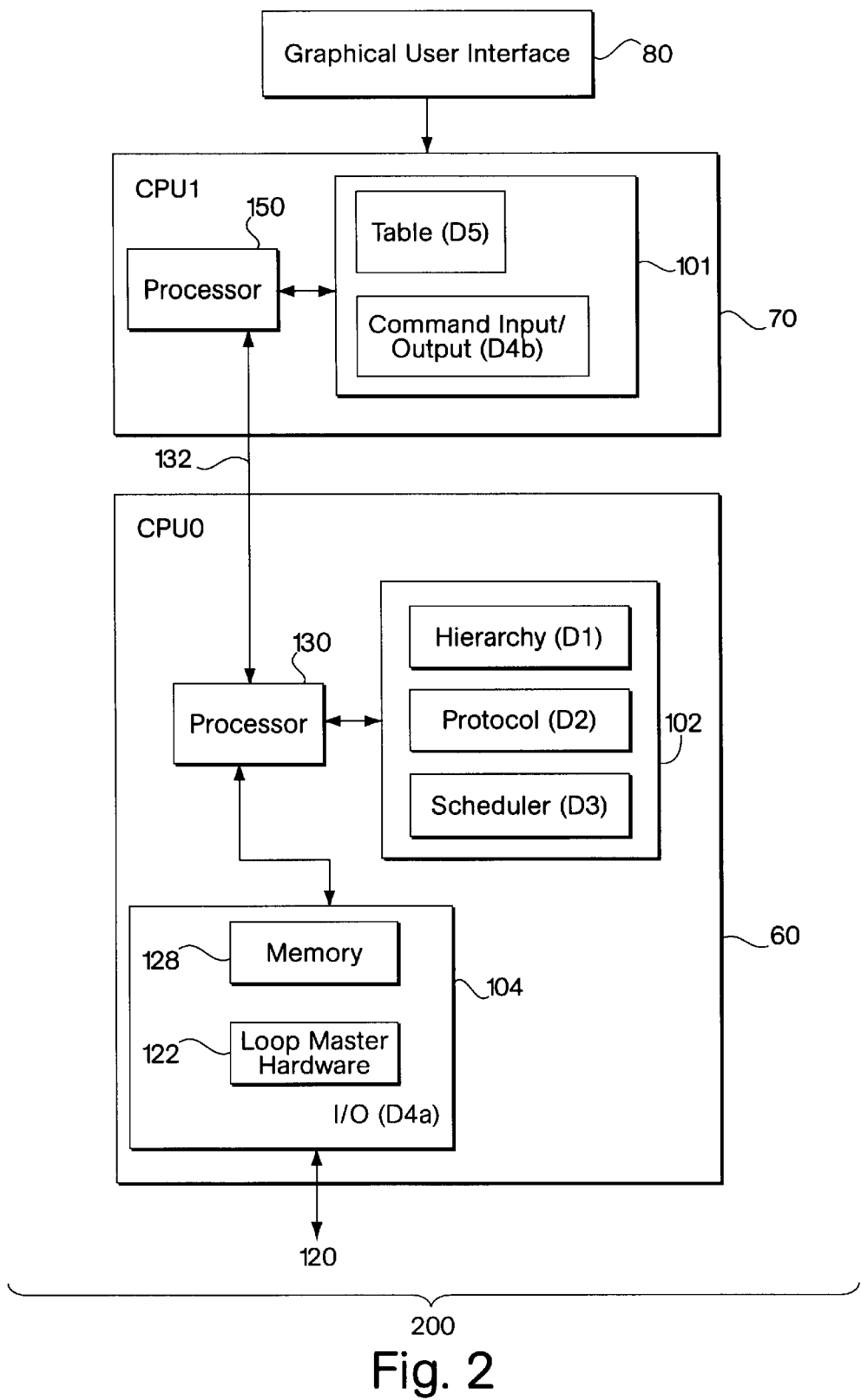
FIG. 2 is a high level block diagram of systems components that are employed in the control system of the present invention and that may be used to control the ion implanter of FIG. 1.

A high level block diagram illustrating one embodiment of hardware and software components that may be used to provide periodic control by the control system 200 is shown in FIG. 2. Specifically, the control system 200 includes an Information Application Network (IAN) Computer 101, a New Control System Computer (NCS) 102, and input/output (I/O) hardware 104. The control system 200 also may advantageously include a table (D5) identifying constraints on the permissible set of input and output signals and states of each of the subsystems to facilitate system revision and control. The table D5 is shown in CPU 70, although it may reside at any accessible location in the control system 200. Each of the IAN, NCS and I/O is described in more detail below.

The IAN 101 and I/O 104 together provide data and command collection for the control system 200. Separating the data collection into two components, one which transfers signal data between the ion implantation system and the control system, and one which transfers commands between a GUI and the control system, allows each of the functions to be independently scheduled in order to reduce the potential for inconsistent states.

I/O 104 comprises hardware that provides data collection means (D4a) for receiving and transmitting signals to properly coordinate each operation of the ion implant system 100. The I/O 104 receives signal lines 120 which are coupled to various control signals in the ion implantation system 100 that are to be monitored or driven by the NCS 102. The control data signals are retrieved by a loop master hardware 122. The loop master hardware samples received control signals to provide representative digital signals that are stored as digital data values in one portion of a dual-ported memory 128.

A processor 130 is coupled to the dual-ported memory 128. One function performed by the processor 130 is reading the digital data values from memory and transferring the data to CPU 70 on line to 132 as well as to the New Control System (NCS) 102 software. The NCS 102 uses the digital data values stored in memory and processed by the digital signal processing and conditioning objects to provide state information to each of the state machines that control and observe each of the subsystems in the ion implantation system.

The IAN 101, in one embodiment, is a software data collection application (D4b) which controls the transfer of data and commands between the control system 200 and the GUI 80. The IAN 101 comprises a user interface that allows a user, for example at the GUI 80, to customize the operation of the ion implantation system 100 by inputting various commands and data to the NCS 102 to affect the operation of the ion implantation system. The user input commands are received and processed by IAN 101 and propagated to the NCS 102 at a predetermined time during each execution cycle of the ion implantation system. Control over the transfer of commands between the IAN 101 and the NCS 102 is provided by processors 150 and 130.

The NCS 102 is a software application that includes a hierarchical control structure (D1) of subsystems representing the operative functions of the ion implantation system. Each of the subsystems performs one or more tasks, and the states of subsystems that are relatively lower in the hierarchy are available to those that are one level relatively higher in the hierarchy for monitoring and control. The NCS 102 also includes protocol control (D2) for determining an order of execution of subsystems in the hierarchy. The NCS 102 further includes a scheduler (D3) for performing the execution of tasks of subsystems within the hierarchy according to the protocol and scheduled according to the timing of tasks performed by each of the associated subsystems.

Structures D1–D5 are functional units that may be implemented in either hardware, software or a combination thereof. Although the different functional units D1–D5 are shown in FIG. 2 as being implemented by certain ones of the CPUs 60 and 70, the present invention is not limited to any particular number of CPUs or any particular distribution of functions among CPUs. However, one advantage of separating the functionality of the control system into different CPUs is that it allows for two different operating systems, or a single operating system with the configuration optimized for each CPU, to be used with the NCS and IAN software programs. This approach assures that the best operating system (or operating system configuration) for data monitoring and gathering is utilized for the IAN, while the NCS relies on the best operating system (or operating system configuration) for control purposes.

In order to establish a hierarchy, each of the subsystems in the ion implantation system is broken down into sub-subsystems. Similarly, sub-subsystems are broken down into sub-sub-subsystems, that identify the components of the given sub-subsystem. The breaking down of subsystems into their component sub-subsystems continues until certain basic subsystems are identified. More details on the creation and evaluation of the hierarchical subsystem structure of the NCS 102 are provided below.

Each subsystem that can be divided into a number of sub-subsystems is said to be a 'parent' with regard to the sub-subsystems, while the sub-subsystems are said to be 'children' with regard to the parent subsystem. The operative functions of each of the subsystems, sub-subsystems, etc., are defined by the combination of state machines and data flow diagrams of the DSPCU associated with the subsystem, sub-subsystem, etc.

The NCS 102 may operate in either an automatic or a manual mode. In addition, each subsystem within the system hierarchy may operate in either an automatic or a manual mode. In automatic mode, commands from the GUI 80 may be sent only to the highest level subsystem in the hierarchy of subsystems. Commands to lower level subsystems in the hierarchy from the GUI 80 are executed only after all of the subsystems in the hierarchy between the highest order subsystem and the parent of the destination subsystem (called the "parent chain") are successfully switched to manual mode. When in manual mode, parent subsystems will not command child subsystems, which assures that a child subsystem will not be commanded by both its parent subsystem and through the GUI 80 at the same time. Therefore, switching to manual mode must start from the highest level subsystem first. In addition, a command sent to a child subsystem will automatically cause the NCS 102 software to command the parent chain to manual mode, from the top down. Manual mode for the NCS 102 software includes all states of the system in which at least the highest level subsystem is in manual mode.

The interconnected data structure D1 thus provides a framework for ordered, coherent decision making by the control system. Ordered decision making and subsystem execution is enforced by the protocol controller D2 and by the scheduler D3. The method used by the protocol controller D2 and the scheduler D3 for scheduling decisions and execution in the subsystems of the hierarchical data structure is described in more detail below. First, the basic structure of one embodiment of the hierarchical data structure and a method for building the hierarchical data structure are described.

D1: The Data Flow Structure

As described above, the operative functions of the ion implantation system are represented using a hierarchy of subsystems, each of which may comprise one or more state machines and a data flow diagram identifying a flow of data to and from DSPCUs.

Separating each subsystem into discrete state machine and DSPCU components simplifies the design and leads to more robust performance because often, during execution, the signal processing operations are significantly different from the decision making aspect of the control.

Figure 3:
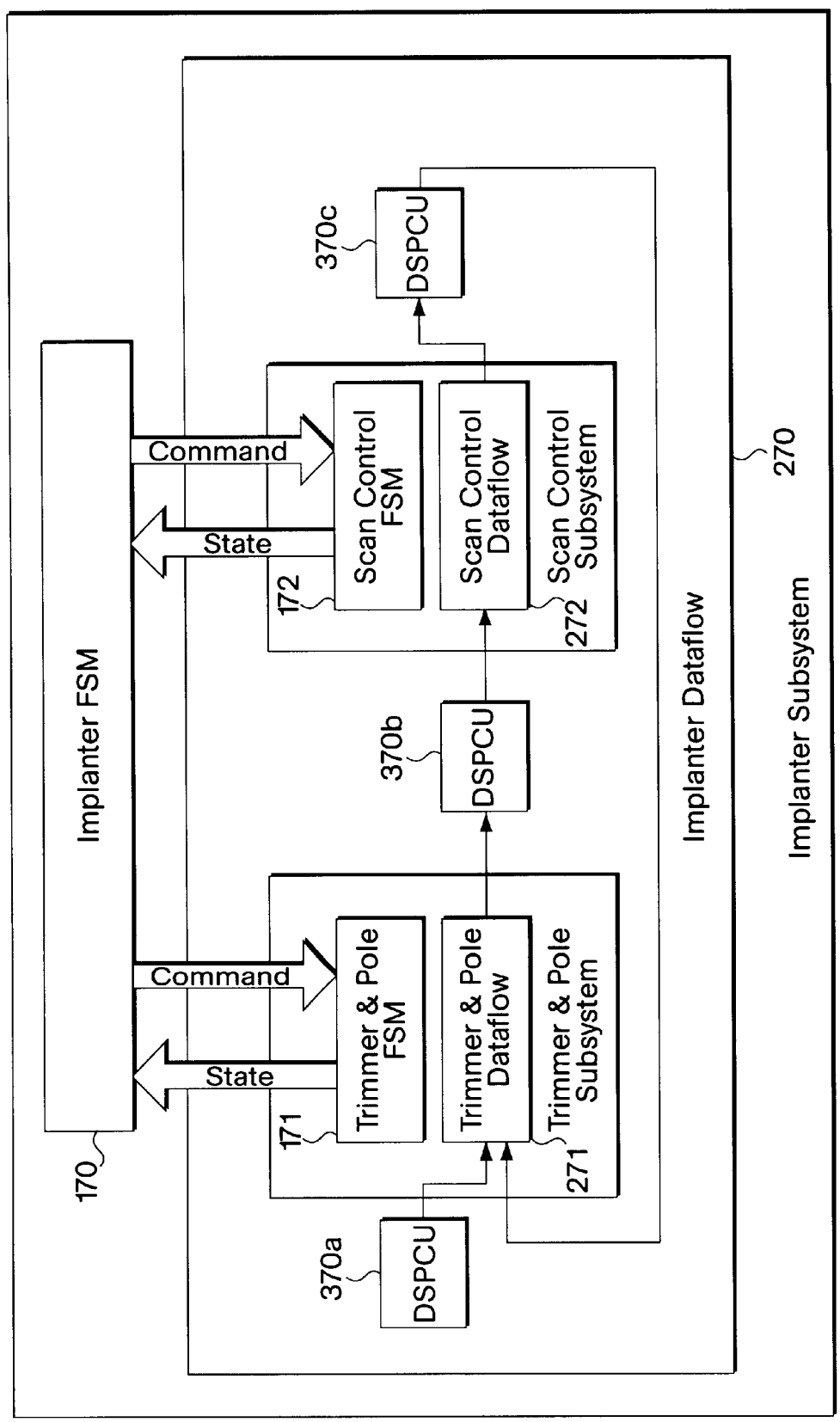
FIG. 3 is a block diagram illustrating an exemplary hierarchical data structure of state machines and digital signal processing and conditioning units that may be used to control the ion implanter of FIG. 1.

For example, as shown in FIG. 3, the parent and two child subsystems are defined by a set of state machines 170–172 and data flow diagrams of DSPCUs 370a, 370b and 370c. If the NCS 102 were used to control the ion implantation system 100 of FIG. 1, state machines 170–172 and the data flow diagrams for DSPCUs 370a, 370b and 370c would provide the operative functionality of the system 100. The subsystem hierarchy is defined at each level by the child subsystems contained within the parent data flow diagram.

For example, the subsystem made up of state machine 170 and data flow diagram 270 may be associated with the ion implantion system, state machine 171 and data flow diagram 271 may be associated with the trimmer and pole control element 36, and state machine 172 and data flow diagram 272 may be associated with the motion scan control element 27. Similarly, other subsystems at the same or lower levels in the hierarchy may be associated with other parts of the ion implantion system. The state machines 171 and 172 are under the direct control of state machine 170. The data flow components 271, 272 and DSPCUs 370a, 370b and 370c are interconnected between subsystems and are not constrained by the hierarchy.

One advantage of arranging the state machines in a hierarchical manner is that it facilitates error handling in the system under control. Each subsystem is responsible for detecting and responding to error conditions. In many cases a subsystem may not be able to determine the appropriate response for an error condition. In this case, the subsystem propagates the error to its parent subsystem, which is then responsible for either responding to the error or further propagating the error up the parent chain. This is referred to as "bubbling up" the error. A parent subsystem by design has control over more of the whole system and has a larger set of information to determine the appropriate response to errors. As a result, error conditions need not be propagated to a top level in the hierarchy, but may be handled at a more appropriate level. If an error propagates to the top subsystem without being resolved, it is then propagated to the IAN 101 for response by a user. By distributing the error handling in this manner, intelligent error handling strategies may be implemented with a minimum of complexity.

Figure 4:
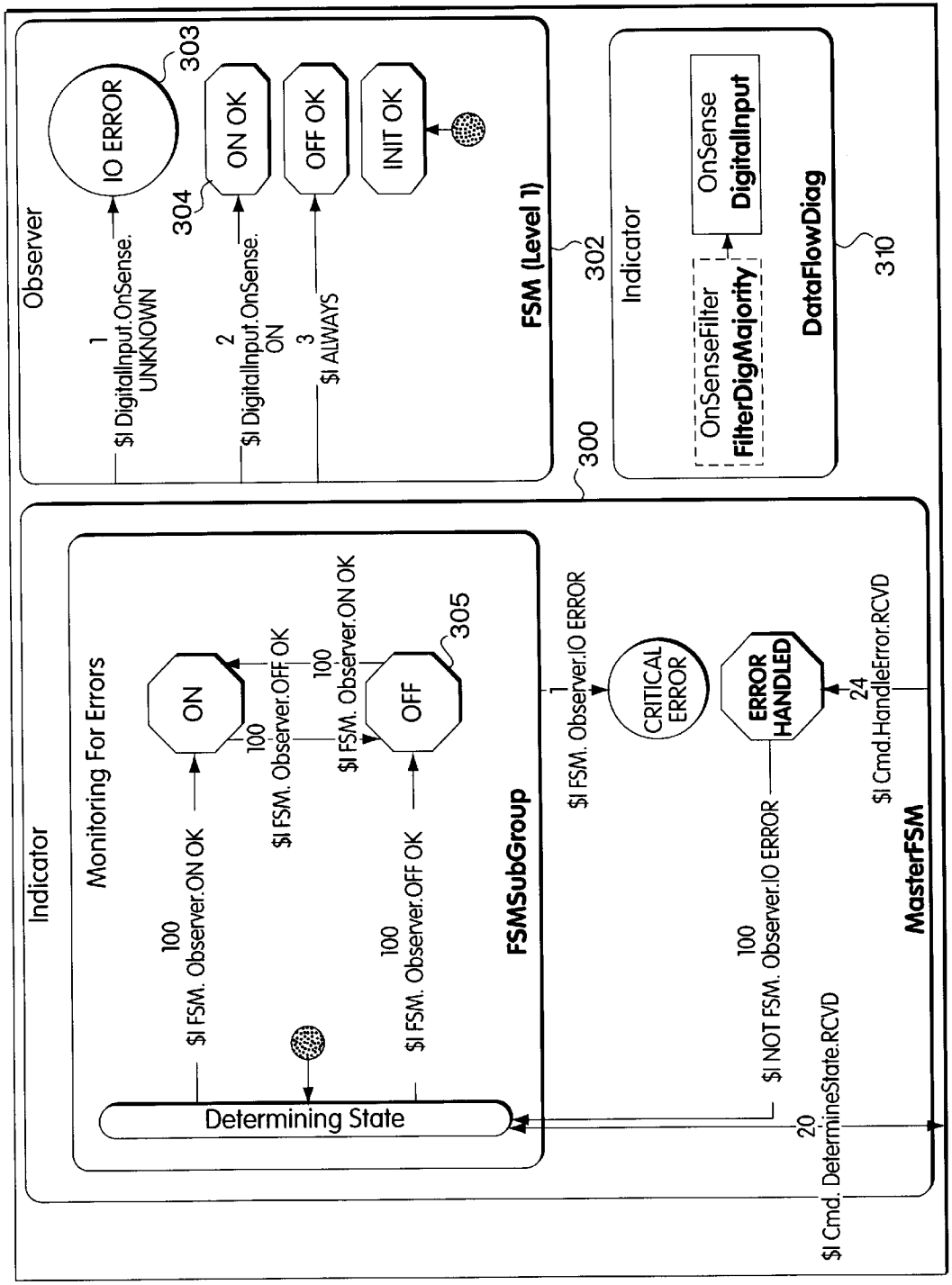
FIG. 4 is a block diagram of an exemplary subsystem that may be represented by the data structure of FIG. 3, illustrating the finite state machine and data flow diagram that represent a typical element of the control system hierarchy.

Referring now to FIG. 4, an example illustrating the components that are potentially included in each subsystem includes a master state machine 300 and a data flow diagram 310. The data flow diagram 310 identifies associated single DSPCUs and another component which configures the behavior of the DSPCU. As shown in FIG. 4, each subsystem may also include one or more additional levels of state machines, such as the observer state machine 302, which are evaluated during execution before the evaluation of the master finite state machine 300. The state machines identify the states and associated transitions taken at the state machine subsystem in response to the input signals.

The subsystem represented by the state machines 300 and 302 in FIG. 4 is an indicator subsystem. There are three different states that may be entered by the indicator subsystem; an error state, a transitional state and a terminal state. Error states are indicated by circles (such as state 303), transitional states are indicated by rounded edge polygons (such as state 304) and terminal states are indicated by octagons such as octagon 305.

In one embodiment, state machine 302 is an observer state machine that is used to sample the input signals received at the indicator subsystem (either from the dual-ported memory 128 or from a child subsystem). Digital inputs can be of state ON, OFF or UNKNOWN. The input signals result in the indicator transitioning to either transition state ON*OK, or OFF*OK, or I/O*ERROR, which is an error state.

The master state machine 300 is shown receiving the status of the transition states as inputs FSM.Observer.On*OK and FSM.Observer.Off*OK. Whenever one of these inputs is asserted (the Observer FSM enters one of those states), the master finite state machine transitions into a terminal state of either ON or OFF. If the FSM.Observer.I/O*ERROR input becomes asserted, the indicator transitions to a terminal SHUTDOWN state.

Building the Data Structures (D1)

The state machine/data flow diagram, also called a subsystem diagram (as shown in FIG. 4), is manually constructed for each subsystem by a user. After a diagram is constructed, it can be described by an interface defined by a set of zero or more commands, a set of one or more states, a set of zero or more data flow inputs and a set of zero or more data flow outputs. When one or more of the subsystems is included in a parent subsystem, a reference to each instance of the child subsystem is provided in the parent data flow diagram through an element which represents the subsystem interface. This element has the same interface as a DSPCU, but actually represents the encapsulated behavior of the child subsystem.

In one embodiment, VISIO™ graphical design tools have been enhanced and are used to create the subsystem designs in the form of diagrams. The VISIO tool allows for data from the state machine/data flow diagrams of a child subsystem to be linked with the parent subsystem as the overall hierarchical structure of the NCS 102 is constructed. Other graphical tools that provide connections between graphical elements and support for external program control may alternatively be used, and the invention is therefore not limited to the use of the VISIO tool.

Figure 5:
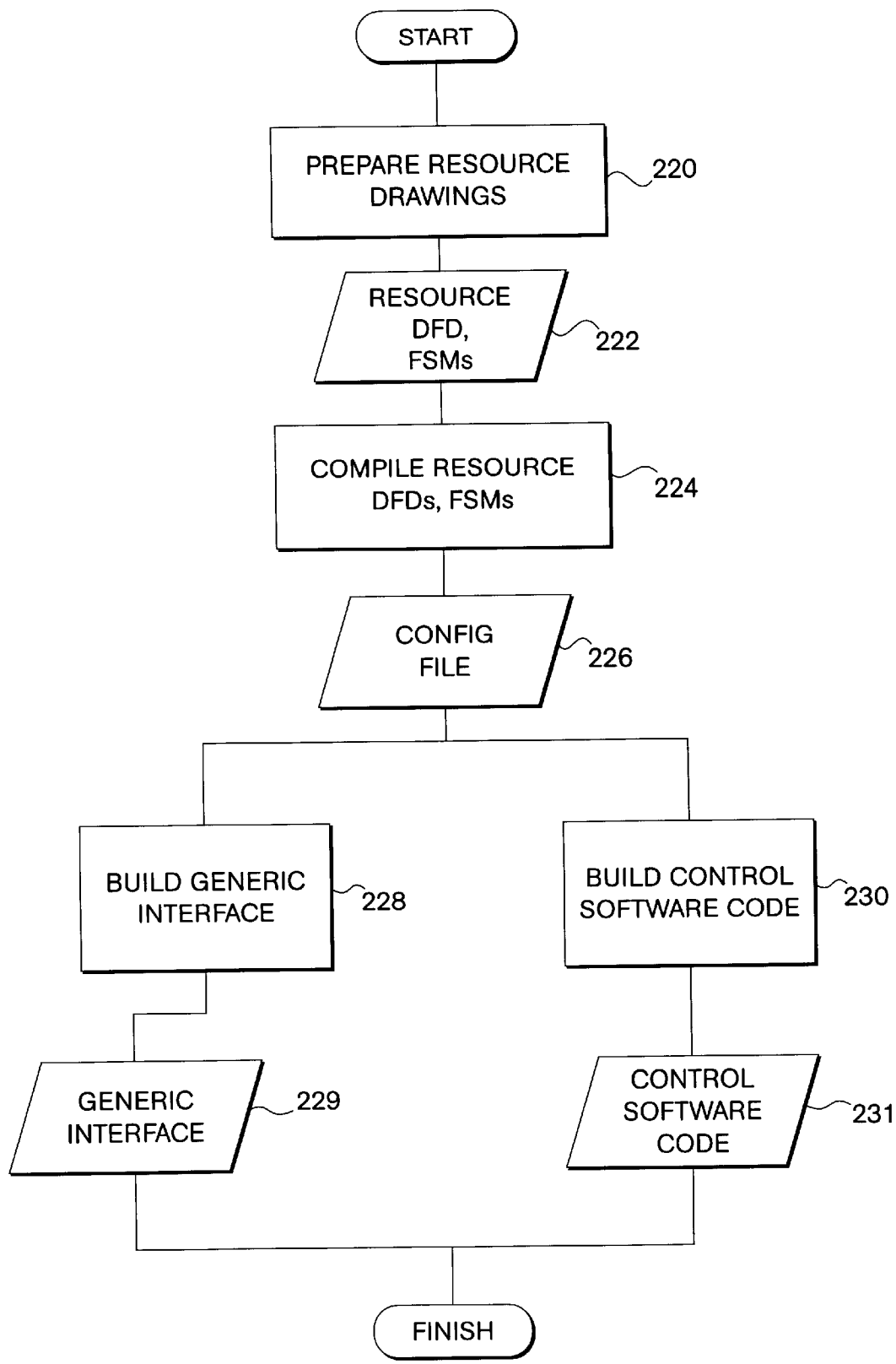
FIG. 5 is a flow diagram illustrating one embodiment of the method used to build a data structure such as that in FIG. 3.

As described above, child subsystems for each parent subsystem are represented in the parent subsystem's data flow diagram. A given subsystem diagram describes the state machines, DSPCU's and the child subsystems linked to the parent. The hierarchy can be defined (and resolved) fully by starting at the highest subsystem diagram and creating (following) the links through each of the child subsystems. Once all of the subsystem diagrams state have been manually entered, a build may be initiated to convert the subsystem diagram into the hierarchical data structures describing all the elements needed to interpret and construct the state machines, the DSPCUs and their interconnections. Below, one method that may be used to convert the subsystem, provided via VISIO™, into a format that enables processing by the NCS 102 is described with references to FIG. 5.

At step 220, as described above, a user prepares subsystem drawings for each of the subsystems that should be represented within the system. A complete set of drawings 222 is provided that includes each of the state machine/data flow diagrams that are included in the hierarchical data structure. At step 224 the build file is compiled. During the compile process, unattached inputs and outputs between the subsystems in the hierarchy, if any, are identified. After any unattached inputs and outputs have been corrected, a configuration file 226 is created. The configuration file is similar to the build file. However, all of the inputs and outputs of the parent/child subsystems have been resolved, and, accordingly, the information for analyzing the upward and downward execution of the parent and child subsystems has been provided.

The configuration file 226 is used by both the CPU 60 and the CPU 70. The CPU 70 uses the configuration file 226 at step 228 to build the IAN 101 generic user interface 229. The generic user interface 229 allows for a user to control the NCS 102 without specific knowledge of which subsystems are actually included in the NCS 102. The CPU 60 uses the configuration file 226 at step 230 as a template to build the software 231 that executes the NCS 102. In addition to the configuration file 226, the CPU 60 uses the scheduler D3 (described in more detail below) to identify which subsystems in the configuration file are to be evaluated during each execution cycle of the ion implantation system.

Scheduling Execution of DSPCUs (D3)

Once the hierarchical data structure representing the operative functionality of the controlled system is generated, a schedule of how each of the subsystems interacts during processing of the controlled system is provided. The schedule is selected to ensure that the operation of each of the subsystems is performed at the appropriate times to achieve desired results.

In one embodiment, the total time for operation of the controlled system is referred to as its total operative time. The total operative time is apportioned into a number of execution cycles, during which time the state of the controlled device is evaluated. During one execution cycle, the hierarchical data structure is analyzed both in an ascending order of the hierarchy and in a descending order of the hierarchy. Each execution cycle may be further apportioned into a number of fundamental time periods. The scheduler schedules the execution of subsystems at appropriate fundamental time periods during an execution cycle, for each of the execution cycles in the total operative time of the controlled device.

Thus, the scheduler D3 orders the execution of the state machines and data flow diagrams of the subsystems that comprise the control system hierarchy. The order of execution determined by the scheduler is based on the respective position of the subsystem in the hierarchy and a selected frequency at which the subsystem is analyzed. For example, the subsystem may be analyzed in every execution cycle or every tenth execution cycle.

The scheduling of execution of state machines and data flow diagrams is performed prior to actual operation of the controlled system to maximize performance of the controlled system. In one embodiment, each state machine and DSPCU is represented as an object, and scheduling is performed using object-oriented programming methods. Each object is assigned to a fundamental time period within the execution cycle. The less frequently an object is selected for execution, the lower the processing overhead associated with that object.

In one embodiment, the assignment of objects to different fundamental time periods is performed by the system designer based upon control requirements. Once the system designer has selected the time period(s) at which the objects are to be executed, a series of schedule lists are generated. As mentioned above, in every execution cycle of operation of the controlled system, both an upward and downward execution is performed. Therefore, the series of lists includes, for each execution cycle, lists identifying DSPCU objects that are executed in an upward phase of execution and lists identifying DSPCU objects that are executed in a downward phase of execution.

Before the series of lists is generated, the hierarchical data structure is evaluated to determine the worst-case run-time conditions of the controlled system; i.e., the maximum amount of time it would take to perform both the upward and downward execution of every DSPCU in the hierarchical data structure. The worst-case run-time is used to determine an amount of time to allow for the execution of each cycle of the controlled system. The determined worst-case run-time is divided by a selected number of processing cycles to determine the fundamental time period.

Figure 6:
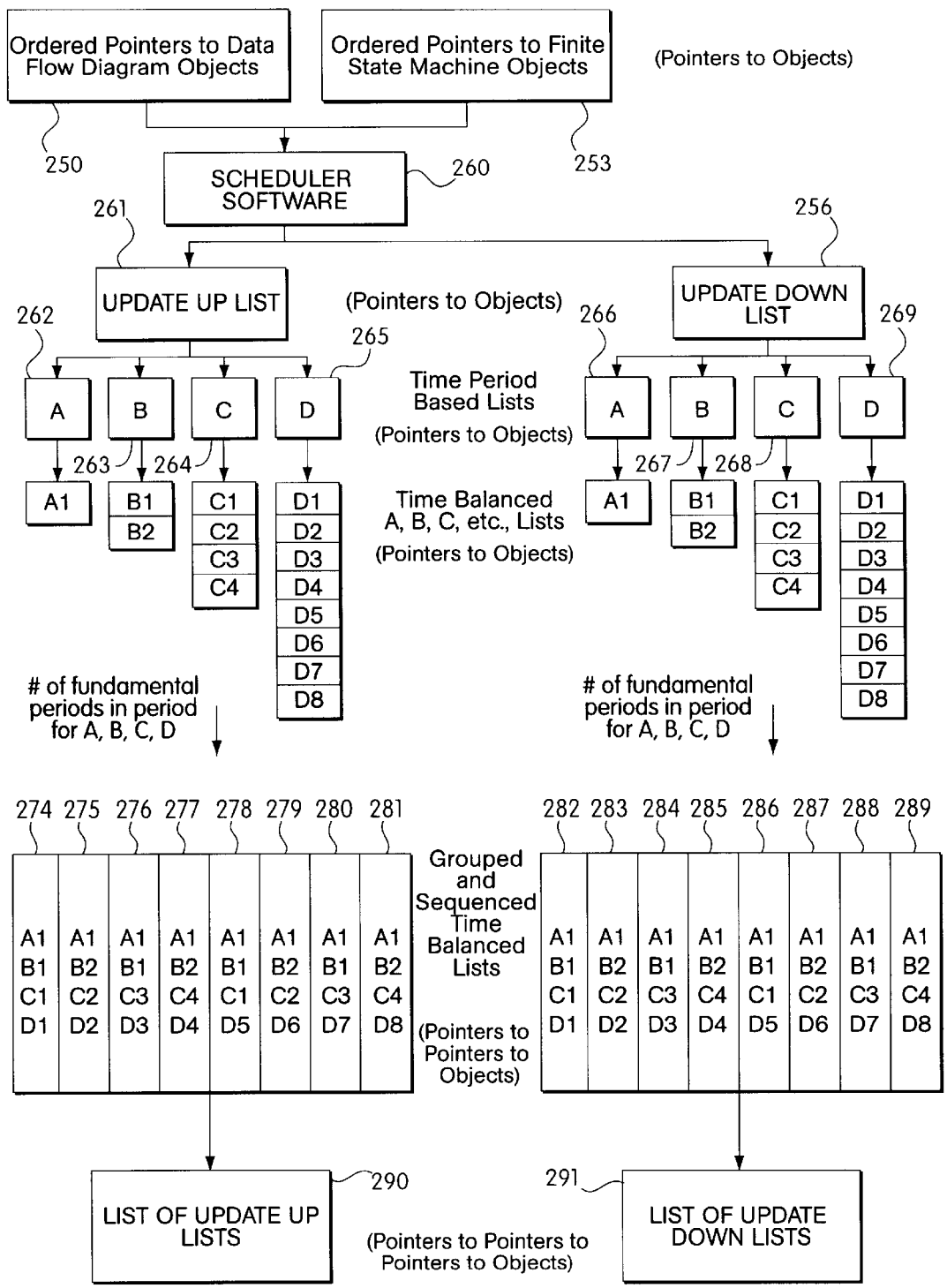
FIG. 6 is a block diagram of components of a scheduler that is used to schedule the operation of the subsystems in the control system of FIG. 2.

Referring now to FIG. 6, a block diagram is provided for illustrating the lists that are generated for calculating worst-case run-time, and the lists that are generated by the scheduler for scheduling the execution of subsystems during the processing cycles.

The DSPCU objects and state machine objects are retrieved from the hierarchical data structure to form lists 250 and 253 using known recursive hierarchical tree searching techniques. List 253 is a list of all the pointers to state machine objects. The pointers are ordered from those pointers that point to state machine objects of the subsystems at the bottom of the hierarchical data structure to those pointers that point to state machine objects of the subsystems at the top of the hierarchical data structure. List 250 is a list of all the pointers to DSPCU objects. The pointers to DSPCU objects are ordered in the order defined by their associated data flow diagram, in order from the DSPCU objects associated with the subsystems at the bottom of the hierarchical data structure to the DSPCU objects associated with subsystems at the top of the hierarchical data structure.

Using the list 253 of pointers to state machine objects, two new lists, an Update Up list 261 and an Update Down list 256 are generated. Update Up list 261 is a combination of the DSPCU object list 253 followed by the state machine object list 250. Update Down list 256 is a combination of the inverse of the list 253 of pointers to state machine objects (i.e., ordered from the bottom of list 253 to the top of list 253) followed by the DSPCU object list 250.

The Update Up list 261 and the Update Down list 256 thus include pointers to objects ordered in accordance with the hierarchical execution protocol. However, the objects in the lists have different timing requirements associated with their execution. That is, each of the objects may be analyzed at different fundamental time periods during an execution cycle of the controlled system. In one embodiment, the time intervals that are available for object execution are restricted to a set of the intervals that are factors of the total number of fundamental time periods in an execution cycle. For example, if the total number of fundamental time periods required for either upward or downward execution was eight, then the time intervals that would be available for object execution would be those time intervals that are factors of eight; one, two, four and eight. Restricting the execution of objects to selected time intervals facilitates balancing, or spreading, of the execution of the objects in the control system throughout the execution period.

Since all of the objects are associated with one of the time intervals of the set, the original Update Up and Update Down lists may be apportioned into as many lists as there are sets (i.e., factors of the total time intervals) using multiple searches of the respective lists. For example, as shown in FIG. 6, assuming that the number of fundamental time periods in one execution cycle of the controlled system is equal to eight, there are four factors of eight; one, two, four and eight. It is assumed that the Update Up list 261 and Update Down list 256 are each comprised completely of objects associated with execution time intervals of one, two, four and eight times the fundamental period. Using search techniques based on the time interval associated with each object, the Update Up list 261 and the Update Down list 256 are apportioned into four distinct lists 262–265 and 266–269, respectively, using the method described with reference to FIG. 7.

At step 700, each of the group lists is assigned a value equal to the time interval associated with the group divided by the least common multiple. In the example of FIG. 6, where the least common multiple is one, the assigned values for each of the groups 262/266, 263/267, 264/268 and 265/269 are equal to eight, four, two and one, respectively. The assigned value determines the number of fundamental time periods in which each of the objects in the group is analyzed during one cycle of execution of the controlled system. Thus, each object in group 262 is analyzed for eight fundamental time periods, while each object in group 265 is executed for one fundamental time period.

Once each group has been assigned a value, at step 702 each group is apportioned into a balanced number of subgroups of objects. The number of subgroups in each pair of groups is determined by calculating the total allowable execution time for all objects in the pair of groups, and dividing this total allowable execution time by the number of fundamental time periods with the pair of groups. Thus, for groups 262, the total allowable execution time is eight fundamental time periods, while the number of fundamental time periods is eight, so there is one subgroup. For group 264, the total allowable execution time is two fundamental time periods, while the total number of fundamental time periods is eight, so there are four subgroups of two fundamental time periods each. Thus, in FIG. 6, groups 262 and 266 have one subgroup each, groups 263 and 267 have two subgroups each, groups 264 and 268 have four subgroups each, and groups 265 and 269 have eight subgroups each.

Once the number of subgroups in each group is determined, objects are distributed from the Update Up list 261 and Update Down list 256 into subgroups of each of the groups. The group into which an object is allocated is determined in response to the associated time interval of the object (one, two, four or eight). The subgroup that the object is placed into is determined in response to the time it takes each object to run and the time allocated to the subgroup.

In one embodiment, a total time allocation for each group is determined by adding the number of fundamental periods associated with the particular group (for example, adding up the total time period for execution of objects associated with the time interval two from the Update Up list and Update Down list). For each group, all of the objects from the Update Up list are filled into Update Up subgroups before objects retrieved from the Update Down list for placement in Update down subgroups, although this is not a limitation of the present invention. Once the objects from the Update Up list 261 have been allocated to subgroups, then, using the remaining time allocated to the group, objects from the Update Down list 256 are allocated to subgroups. Thus, at step 704, it is determined whether the Update Up list for the group is empty. If not, the process proceeds to step 706, where the next successive object for the group is selected from the Update Up list 261.

As mentioned above, each subgroup has associated therewith an allocated time period which is some multiple of the fundamental time period. Objects are placed into subgroups until the allocated time period for the subgroup has been matched, then objects are placed in the next successive subgroup for the group. Thus, at step 708, the execution time for the object (stored, for example, as a property of the object) is added to the total subgroup execution time and is compared against the allocated subgroup time. If the sum exceeds the allocated subgroup time, at step 710 the next subgroup is retrieved. If the sum does not exceed the allocated subgroup time at step 708 or once the new subgroup is retrieved at step 710, at step 712 the object is placed in the subgroup, and the total time and subgroup times are incremented. At step 714, a comparison is made against the maximum allocated group time. If time remains for analyzing the group, the process returns to step 704.

When it is determined that the Update Up list is empty, objects are moved from the Update Down list 256 to associated update down subgroups for the group via steps 716 through 722 until, at step 714 it is determined that all the time allocated to the group is met.

Figure 7:
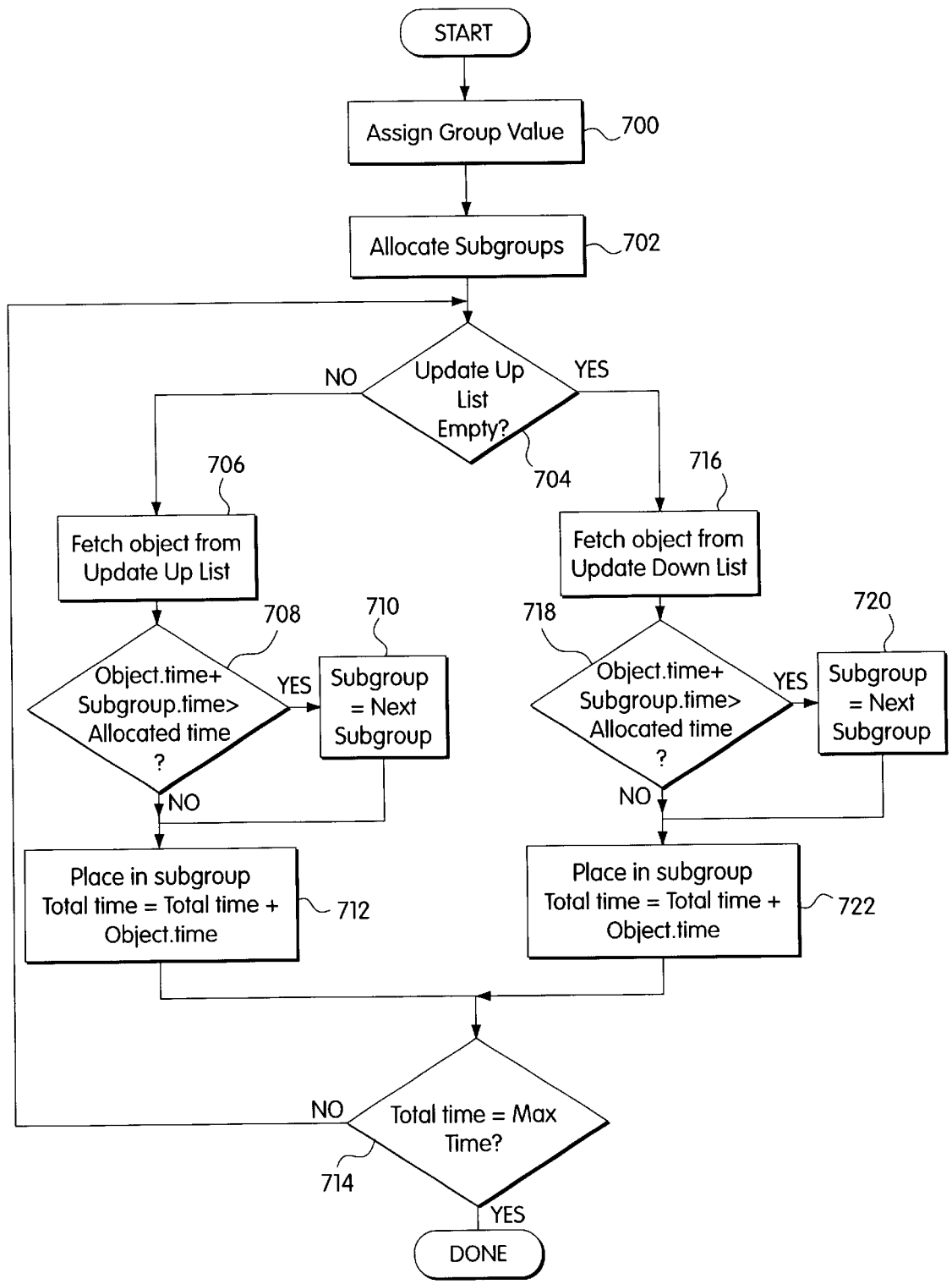
FIG. 7 is a flow diagram of one embodiment of a method of scheduling employed by the scheduler of FIG. 6.

Thus, using the process illustrated in FIG. 7, the objects are selected from the respective Update Up and Update Down lists for placement into specific groups according to their associated time interval (one, two, four or eight). In group pair 262 and 266, since there is only one subgroup, all of the objects are in subgroup A1. For group pair 263 and 267, objects are either in subgroup B1 or B2.

The result of the process described in FIG. 7 is a series of time period based lists, each of which includes pointers to state machine and DSPCU objects from the hierarchical data structure and identifies the fundamental time period(s) at which the associated object is analyzed during one execution cycle of the controlled system. The time period based lists are used to generate run time execution lists 274–289 (FIG. 6), which are lists of pointers to the subgroups. The run time execution lists identify the order of execution of each of the subgroups of objects for each of the fundamental cycles in one upward and downward execution of the controlled system. Using the example of FIG., 6, where the execution of the controlled system includes eight fundamental time periods, the Update Up run time execution list comprises eight run time execution upward execution lists 274–281 and the Update Down run-time execution list comprises eight run-time execution downward execution lists 282–289. For each fundamental time period, an upward and downward pair of run-time execution lists is executed, with the objects in each of the subgroups pointed to in the run-time execution lists being executed in order.

The run-time execution lists are constructed as follows. For each fundamental time period, one of the subgroups from each of the time period based lists is included in the run-time execution list. Each of the next successive subgroups in the group is selected for execution in successive cycles. Separating subgroups into different fundamental time periods distributes operations across the execution cycle, thereby limiting the number of objects that is processed in a given time period to a manageable quantity.

The run-time execution lists are used to generate an Update Up lists 290 and Update Down lists 291, each of which is a list of pointers to run-time execution lists such as lists 274–289. Thus, one set of eight lists, such as list 274–281 is provided for each execution cycle of the controlled system. In one embodiment, a timer (either implemented in software or hardware) is incremented from zero to the total number of execution cycles of the controlled device. For each timer increment, one list is generated in each Update Up list 290 and Update down list 291 by copying pointers from each of the run-time lists to the respective lists. For example, if there are 1000 execution cycles in one operative cycle of the controlled system, the Update Up lists 290 include 1000 run-time execution lists. The Update Up lists 290 and Update Down lists 291 thus provide the scheduling of operations for each of the execution cycles of the controlled system. Scheduling execution of each of the objects prior to the actual run-time of the controlled system reduces the run-time overhead and therefore enhances the performance of the controlled system.

Although the above method of scheduling execution of objects from a hierarchical data structure has the advantage of distributing the execution operations over a desired execution period, the present invention is not limited to the above described steps. Rather, any method of scheduling execution of the objects that allows for the hierarchical structure of the objects to be maintained may alternatively be used.

D2: Protocol Control

Figure 8:
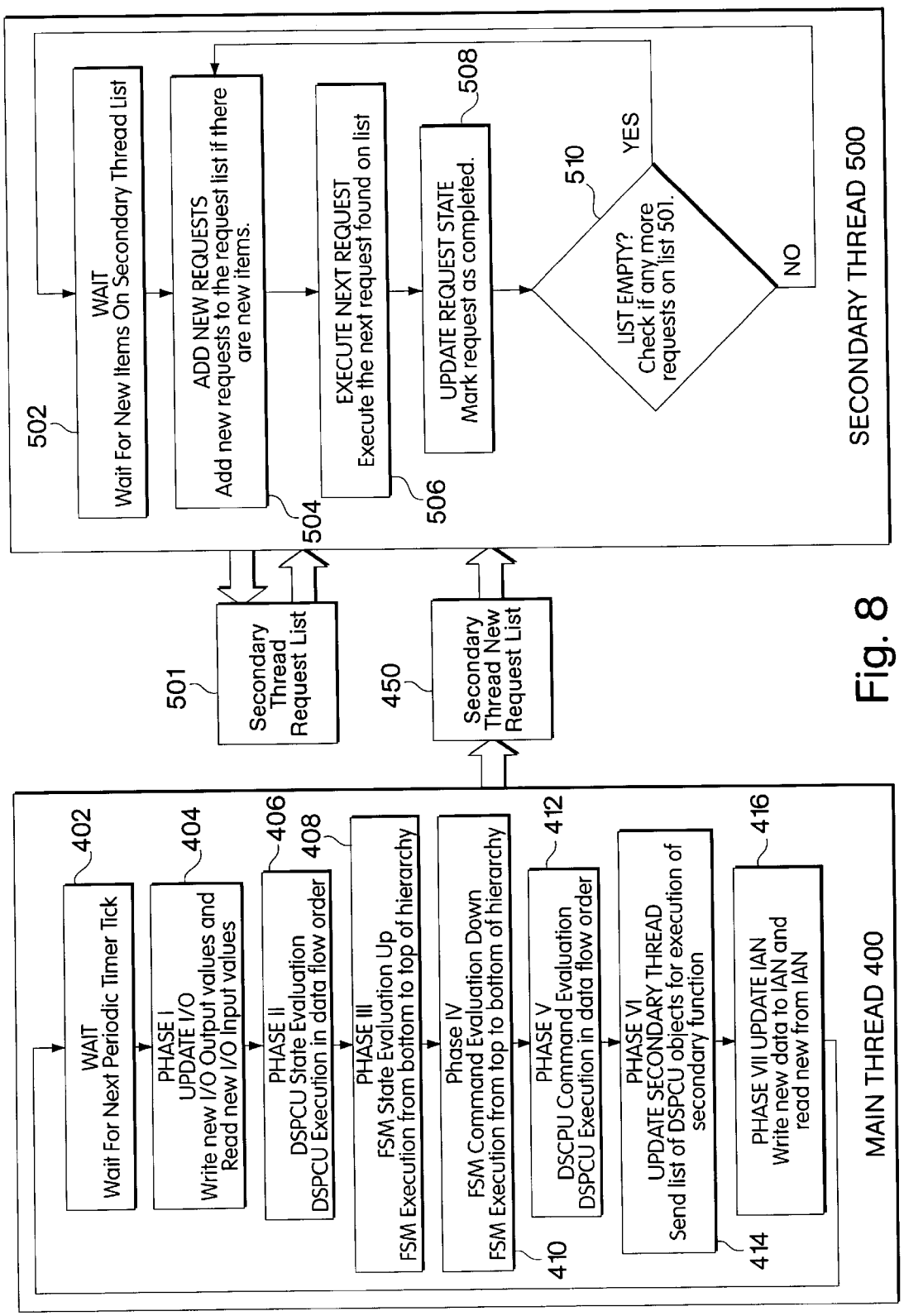
FIG. 8 is a flow diagram for illustrating an execution protocol used in the control system of FIG. 2.

The protocol controller D2 enforces an execution protocol of the DSPCU and state machine elements of the children/ parent subsystems for each execution cycle of the controlled system. The protocol comprises two separate execution programs, called threads, as shown in the flow diagram of FIG. 8. One program, a main thread 400, is for state evaluation and command evaluation of DSPCUs and state machines in a tightly controlled periodic time frame. The other program, a secondary thread 500, is for execution of possibly longer individual calculations by the DSPCUs. The two threads operate independently, where the secondary thread 500 is under the control of the DSPCUs in the main thread 400.

The main thread 400 has seven phases of execution and involves the IAN 101, the NCS 102 and the I/O 104 components described above with reference to FIG. 2. The operation of the protocol controller is now described with reference to FIG. 8, referencing elements of the control system 200 illustrated in FIG. 2.

A first step 402 is for synchronization to provide periodicity to the operation of each execution cycle. Once a periodic timer has elapsed, operation proceeds to step 404.

At step 404, phase I of the execution protocol is initiated. Data collection is performed at I/O 104, and the new output signal values are stored into, and the new input signal values are read from the memory 128. Output signals calculated by the DSPCUs during the previous phase II, step 406, and phase V, step 412, are stored in numeric format into the dual ported memory of I/O 104 for controlling the physical hardware associated with each of the subsystems. Input signal values from the physical hardware are read from the dual ported memory of I/O 104 and are stored in memory in the NCS 102 for evaluation in the next phase.

At step 406, phase II of the execution protocol is initiated. During phase II, the NCS 102 executes the state evaluation function of the DSPCUs of the subsystems. The execution order is dictated by the combined data flow diagrams of all subsystems, from left to right, in the order defined by the data flow arrows, from the least senior child subsystem in the hierarchy to the most senior parent in the hierarchy.

At step 408, phase III of the execution protocol is initiated. During phase III, the NCS 102 executes the state evaluation function of each of the state machines in the hierarchy. The execution is in order from the state machines that are lowest in the hierarchy to those that are highest in the hierarchy. Thus, state machines associated with children sub-subsystems are analyzed before state machines associated with their parent subsystems.

Phase II and phase III together comprise the state evaluation in upward execution phases. When performing the upward state evaluation execution, inputs received only from children subsystems (or inputs received directly from the I/O 104) are used to evaluate the state machines and DSPCUs of a parent subsystem.

At step 410, phase IV, the NCS 102 executes the command evaluation function of each of the state machines in the hierarchy. The execution order is from the most senior parent through to the least senior child.

At step 412, phase V, the NCS 102 executes the command evaluation function of each of the DSCPUs. The execution order is in the same order as during phase II, namely data flow order.

If new requests were added to a secondary thread new request list 450 by the DSPCUs, these requests are sent to the secondary thread 500 at step 414, phase VI.

When the above-described phases of execution have been completed, software within the IAN 101 is updated in step 416, phase VII. At step 416, data from the NCS 102 is sent to the IAN 101. Ian 101 then forwards commands that have been received from the graphical user interface, from IAN applications, and data collected since the data collection step 404 of the previous cycle to the NCS 102. After the downward phase of execution has been completed, output signals provided by the state machines are stored in digital format at the dual ported memory of I/O 104. The digital output is retrieved and translated into analog signals if necessary, for controlling the physical hardware of each of the subsystems. The process proceeds back to step 402 to wait for the next periodic timer tick, where a wait state is entered until the start of the next execution cycle.

The secondary thread 500 operation starts when one or more DSPCUs add requests. A DSPCU may add an execution request to the secondary thread new request list 450 during step 414, phase VI, operation. When new requests are received by the secondary thread 500, the new execution requests are removed from the new request list 450 and are added to a secondary thread request list 501 in step 504. The secondary thread 500 executes each request in the order given, after previous requests are completed, in step 506. The execution of each request may run for many periodic cycles of the main thread 400. This allows a DSCPU to execute longer calculations without interfering with the periodicity of the main thread 400. The DSPCU evaluates the state of its execution request during each of the subsequent phase II state evaluations (step 406) until execution of the request is completed by the secondary thread in step 508. The secondary thread 500 continues to execute requests until the list is empty. The secondary thread 500 waits at step 502 until the main thread 400 generates more requests.

The up/down execution environment described above allows for a high degree of coordinated control to be exerted over the subsystems within the ion implant system 100. By separating the effects of input signals provided from hardware from the effects of commands provided by the user, the state of operation of the ion implant system may first be evaluated before commands are issued that impact that state. In addition, by performing a two-phase execution of the state machines and DSPCUs, the true state of each subsystem may be determined since it is affected by the two different types of inputs.

Accordingly, an improved method and apparatus for controlling complex systems has been provided that includes a plurality of hierarchically coupled state machines that reflect control the operations of associated subsystems within the control system. One feature of the new control system is that it is periodic. Because the state machines are evaluated at periodic intervals within a given analytical time period, an accurate representation of the state of the subsystem at any given time is provided. A second feature of the control system is that it has a synchronized interface to both input/output signals as well as the user commands from the user interface. By separating the execution of the signals as well as to user commands from the user interface. By separating the execution of the signals from that of the commands, it can be assured that the impact of the commands are synchronized with the actual states of the system to be controlled. In addition, because the control system is based on a hierarchical state machine arrangement, the addition or deletion of elements within the control system may be easily accommodated by providing or removing appropriate communication links in parent and child subsystems. Accordingly, no redesign of system components is required for adding and deleting clearly identifiable for subsystems that are added to and deleted from the existing of subsystems in the control system. In addition, due to the hierarchical nature of the control system, error conditions may be propagated at only to the appropriate supervisory level within the control system. As a result, error handling is distributed among the control system to thereby reduce the overall complexity of handling at any one subsystem, while allowing for informed error handling.

Although the above control system has been described with regard to an ion implant system, it should be understood that the present invention is not limited to such a use but rather is intended to cover the control of any complex systems that may be modularized into subsystems. Accordingly, the above control system, which uses hierarchical subsystems defined by hierarchical state machines that are inter-coupled to maximize adaptability and error handling may be expanded for use in other systems as well.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for controlling a device having a plurality of interconnected subsystems coupled in a hierarchy, with subsystems at a given level in the hierarchy being included in a subsystem at an immediately higher level of the hierarchy, the system comprising:
 a plurality of hierarchically coupled state machines, with at least one state machine associated with each of the hierarchically coupled subsystems;
 means for evaluating the states of the state machines for each of the hierarchically coupled subsystems in an order defined by the hierarchy; and
 a scheduler for scheduling an order of execution of the plurality of subsystems during operation of the controlled device and determining the order of execution of the subsystems in the hierarchy in response to a total execution time of each of the subsystems of the device and in response to a selected number of cycles for execution of the device,
 wherein a time period is associated with each of the subsystems for indicating how often the associated subsystem is to be evaluated during operation of the controlled device, and wherein the order of execution of the subsystems is determined in response to the associated time period of each of the subsystems.

2. The system according to claim 1 further comprising, for each of the hierarchically coupled subsystems:
 a digital signal processing and conditioning object, coupled to the at least one state machine, for transferring signals into and out of the associated subsystem; and
 a user interface, coupled to the hierarchically coupled state machines, for transferring commands to the hierarchically coupled state machines.

3. The system according to claim 2, further comprising:
 a memory for storing signals associated with each of the plurality of subsystems;
 means for evaluating the plurality of hierarchically coupled state machines responsive to signals stored in the memory, wherein state machines that are relatively lower in the hierarchy are evaluated before state machines that are relatively higher in the hierarchy, and wherein the state machines are evaluated using state data received only from state machines relatively lower in the hierarchy and from data flowing into the digital signal processing and conditioning objects;
 means for receiving commands from an external user; and
 means for evaluating the plurality of hierarchically coupled state machines responsive to the commands from the external user, wherein state machines that are relatively higher in the hierarchy are evaluated before state machines that are relatively lower in the hierarchy, and wherein state machines are evaluated using commands received only from state machines that are relatively higher in the hierarchy.

4. The system according to claim 1, wherein the means for evaluating the states of the state machines operates to evaluate state machines that are relatively lower in the hierarchy before the evaluation of state machines that are relatively higher in the hierarchy.

5. The system according to claim 4, wherein the means for evaluating the states of the state machines evaluates the state of a state machine using state data received only from state machines that are relatively lower in the hierarchy.

6. The system according to claim 4, wherein the means for evaluating the states of the plurality of state machines evaluates the state of a state machine using command data received only from state machines that are relatively higher in the hierarchy.

7. The system according to claim 1, wherein each of the plurality of hierarchically coupled state machines comprises at least one error state for identifying an error in the associated subsystem.

8. The system according to claim 1, wherein each of the plurality of hierarchically coupled state machines further comprises at least one transitional state for identifying a changing state of the associated subsystem.

9. The system according to claim 1, wherein each of the plurality of hierarchically coupled state machines further comprises at least one terminal state for indicating a fixed state of the associated subsystem.

10. The system according to claim 1, wherein each of the plurality of hierarchically coupled subsystems further comprises a data flow diagram, and wherein the at least one state machine and data flow diagram are provided to indicate the operative state of the associated subsystem.

11. The system according to claim 10, wherein the scheduler further comprises:
 a first ordered list of state machine pointers to state machines of the hierarchical coupled subsystem, the state machine pointers ordered in ascending hierarchical order of the associated subsystems;
 a second ordered list of data flow pointers to the data flow diagrams of the hierarchically coupled subsystem, the data flow pointers being ordered in data flow order and in ascending hierarchical order of the associated subsystems;
 an upward execution list, comprising the second list followed by the first list; and
 a downward execution list, comprising the first list in reverse order followed by the second list.

12. The system according to claim 11, wherein each of the time periods associated with each of the subsystems is selected from a set of available time periods that are factors of a total number of time periods used for execution of the device.

13. The system according to claim 12, further comprising:
 a plurality of sets of upward update lists having a plurality of entries, the sets of upward update lists corresponding in number to a number of time periods in the set of available time periods, each entry of the set of upward update lists for storing a pointer to one of the entries in the upward execution list;

a plurality of sets of downward update lists having a plurality of entries, the sets of downward update lists corresponding in number to a number of time periods in the set of available time periods, each entry of the set of downward update lists for storing a pointer to one of the entries in the downward execution list; and means for copying the state machine pointers and data flow pointers from the upward execution lists and the downward execution lists to one or more of the plurality of upward update lists and downward update lists, respectively, responsive to an allocated time period for the execution of the subsystem associated with the pointer.

14. The system according to claim 13, further comprising:

a plurality of upward scheduled lists having a plurality of entries, the upward scheduled lists corresponding in number to the total number of time periods used for execution of the device, each of the entries of the upward scheduled lists for storing pointers to the upward update lists;

a plurality of downward scheduled lists having a plurality of entries, the downward scheduled lists corresponding in number to the number of time periods used for execution of the device, each of the entries of the downward scheduled lists for storing pointers to the downward update lists; and means for copying pointers from the plurality of upward update lists to the plurality of upward scheduled lists, and for copying pointers from the plurality of downward update lists to the plurality of downward scheduled lists, wherein the pointers are selected for copying to an associated one of the plurality of scheduled lists according to the time period of their associated subsystem.

15. The system according to claim 14, further comprising:

a master upward list comprising a plurality of entries corresponding in number to a total number of time periods for execution of the device, the master upward list for storing pointers to subsystems that are analyzed at each associated time period;

a master downward list comprising a plurality of entries corresponding in number to the total number of time periods for execution of the device, the master downward list for storing pointers to subsystems that are executed during the associated time period;

a timer for measuring and controlling the time period; and means, coupled to the timer, the master upward list, the master downward list, the plurality of upward scheduled lists and the plurality of downward scheduled lists, for storing pointers to the plurality for upward scheduled lists in the master upward list and for storing pointers to the plurality of downward scheduled lists in master downward list responsive to the measured and controlled time period.

16. The method for analyzing a system having a plurality of interconnected subsystems coupled in a hierarchy, with subsystems at a given level in the hierarchy being included in a subsystem at an immediate higher level of the hierarchy, each one of the interconnected subsystems being associated with a corresponding one of a plurality of hierarchically coupled state machines, the method comprising the steps of:

evaluating, for each subsystem, a state of the associated state machine, wherein an order of evaluation of the associated state machines is determined in response to an order defined by the hierarchy of the plurality of interconnected subsystems; and scheduling the execution of subsystems in the hierarchy of state machines, wherein associated with each of the subsystems is a time period for indicating how often the associated subsystem is to be evaluated, and wherein the step of scheduling includes the step of determining the order of execution of the subsystems in response to the time period of each of the subsystems, and wherein the step of determining the order of execution is firther performed in response to a total execution time of the system.

17. The method according to claim 16 wherein associated with each of the subsystems is a data flow diagram comprising digital signal processing and conditioning objects, and wherein the method further comprises the steps of:

transferring selected external signals into and out of each of the hierarchically coupled subsystems, wherein the external signals that are transferred into and out of each subsystem are those external signals associated with digital signal processing and conditioning objects that are relatively lower in the hierarchy than each state machine; and transferring commands into each of the hierarchically coupled state machines, wherein the commands transferred into each of the state machines are commands that are received at the each state machine from subsystems that are relatively higher in the hierarchy than the each state machine.

18. The method according to claim 17, wherein the step of evaluating the state of the associated state machine in the order defined by the hierarchy evaluates state machines associated with digital signal processing and conditioning objects that are relatively lower in the hierarchy before the evaluation of state machines associated with digital signal processing and conditioning objects that are relatively higher in the hierarchy.

19. The method according to claim 16, wherein the order of evaluating the state of the state machines is from those state machines associated with subsystems that are relatively lower in the hierarchy to those state machines associated with subsystems that are relatively higher in the hierarchy.

20. The method according to claim 16, wherein the step of evaluating the state of the associated state machine in the order defined by the hierarchy further comprises the steps of:

storing signals received from the plurality of subsystems of the system in a memory;

evaluating state machines associated in an upward direction responsive to the signals stored in the memory, wherein state machines associated with subsystems that are relatively lower in the hierarchy are evaluated before state machines associated with subsystems that are relatively higher in the hierarchy, and wherein each state machine is evaluated using state data received only from state machines associated with subsystems that are relatively lower in the hierarchy than the each state machine;

receiving commands from an external user; and evaluating the state machines in a downward direction responsive to the commands from the external user, wherein state machines that are associated with subsystems that are relatively higher in the hierarchy are evaluated before state machines that are associated with subsystems that are relatively lower in the hierarchy, and wherein each state machine is evaluated using commands received only from state machines associated with subsystems that are relatively higher in the hierarchy than the each state machine.

21. The method according to claim 20, wherein associated with each of the interconnected subsystems is a data flow diagram, and wherein the step of evaluating the state machines in an upward direction includes the step of evaluating the data flow diagrams of the subsystems in ascending hierarchical order before evaluating the state machines of the associated subsystems in ascending hierarchical order.

22. The method according to claim 21, wherein the step of evaluating the state machines in a downward direction includes the step of evaluating the data flow diagrams of the subsystems in descending hierarchical order after evaluating the state machines of the associated subsystems in descending hierarchical order.

23. The method according to claim 16, wherein each of the state machines comprises at least one error state for identifying an error at the associated subsystem.

24. The method according to claim 16, wherein each of the state machines further comprises at least one transition state for identifying a changing state of the associated subsystem.

25. The method according to claim 16, wherein each of the state machines further comprises at least one terminal state for indicating a fixed state of the associated subsystem.

26. The method according to claim 16, wherein associated with each of the state machines is an error state for indicating an error at the associated subsystem, and wherein the errors for each of the associated subsystems are forwarded to a predetermined level in the hierarchy of subsystems.

27. A control system for controlling a device comprising:
 a processor, coupled to the device, the processor comprising:
  a memory for storing signals associated with the device, where the signals are received from the device and forwarded to the device during operation of the device;
  a hierarchical data structure comprising a plurality of hierarchically interconnected subsystems representative of the operative functions of the device, wherein each of the interconnected subsystems is represented by at least one object;
  means for forwarding the signals to the hierarchical data structure;
  means, responsive to the signals, for updating states within the hierarchical data structure in a controlled manner, wherein the means for updating the states within the hierarchical data structure in a controlled manner includes means for evaluating states of objects in ascending hierarchical order and in descending hierarchical order during an execution cycle; and
  a scheduler, for scheduling the execution of each of the objects of the hierarchical data structure during operation of the device, wherein scheduling is performed in response to an execution protocol of the control system;
  wherein each of the at least one objects further includes at least one of either a state machine or a data flow diagram, and wherein the execution protocol of the control system dictates an order of execution of the state machines or data flow diagrams of the hierarchical data structure.

28. The control system according to claim 27, wherein the means for evaluating the states of objects in ascending hierarchical order evaluates the state of each of the objects using information from objects that are relatively lower in the hierarchical data structure than the each object.

29. The control system according to claim 27, wherein the means for evaluating the state of objects in descending hierarchical order evaluates the state of each of the objects using information from objects that are relatively higher in the hierarchical data structure than the each object.

30. The control system according to claim 27, wherein the execution protocol includes four phases of execution comprising an ascending data flow execution phase, an ascending state machine execution phase, a descending state machine execution phase and a descending data flow execution phase.

31. The control system according to claim 27, wherein the device is an ion implantation system.

* * * * *